United States Patent
Keshavarzian

(10) Patent No.: US 9,037,181 B2
(45) Date of Patent: *May 19, 2015

(54) MULTI-TONE WAKEUP MECHANISM FOR A WIRELESS NETWORK

(71) Applicant: Abtin Keshavarzian, Mountain View, CA (US)

(72) Inventor: Abtin Keshavarzian, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 247 days.

This patent is subject to a terminal disclaimer.

(21) Appl. No.: 13/692,758

(22) Filed: Dec. 3, 2012

(65) Prior Publication Data

US 2014/0155115 A1 Jun. 5, 2014

(51) Int. Cl.
*H04B 7/00* (2006.01)
*H04W 52/02* (2009.01)

(52) U.S. Cl.
CPC .................................. *H04W 52/0235* (2013.01)

(58) Field of Classification Search
CPC . H04W 52/0235; H04W 84/00; H04W 52/02; H04W 52/0229; H04W 54/0225; H04H 60/33
USPC .............. 455/414.1, 418, 420, 507, 515, 517, 455/556.1, 572, 574; 370/338, 350
See application file for complete search history.

(56) References Cited

U.S. PATENT DOCUMENTS

| 7,720,465 B2 * | 5/2010 | Keshavarzian et al. .... 455/414.1 |
| 8,010,091 B2 * | 8/2011 | Keshavarzian et al. .... 455/414.1 |
| 2007/0077951 A1 * | 4/2007 | Manjeshwar et al. ........ 455/515 |
| 2010/0315981 A1 | 12/2010 | Keshavarzian et al. |

FOREIGN PATENT DOCUMENTS

| EP | 1855493 A2 | 11/2007 |
| EP | 2464175 A2 | 6/2012 |

OTHER PUBLICATIONS

International Search Report and Written Opinion corresponding to PCT Application No. PCT/US2013/072652, mailed Jun. 26, 2014 (10 pages).

\* cited by examiner

*Primary Examiner* — Nhan Le
(74) *Attorney, Agent, or Firm* — Maginot Moore & Beck LLP

(57) ABSTRACT

A method of operating a wireless network includes sending a pattern of wakeup tones. Each of the wakeup tones has a different frequency. A sleep mode is periodically awoken from to listen for the wakeup tones. The pattern of wakeup tones is received during the listening. It is decided whether to listen for at least one second tone. The deciding is dependent upon the received pattern of wakeup tones.

17 Claims, 16 Drawing Sheets

RF Wakeup Process

Example of wakeup schedule

MULTI-TONE WAKEUP MECHANISM FOR A WIRELESS NETWORK

BACKGROUND

1. Field of the Invention

The patent relates to the employment of frequency tones and/or tone patterns to wake up a node in a wireless sensor network.

2. Description of the Related Art

In wireless sensor networks, to save energy the nodes may perform a radio-frequency (RF) wakeup procedure, in which during a majority of the time the nodes are in a power down mode, and in which, periodically, the nodes wake up to sample the wireless channel for any signal, and if a signal is present they remain in an active mode to receive the message. In this regard, the signal may be followed by a message, the type of which indicates the action or actions that are required to be performed by the awakened node after the wakeup, and in certain instances it may be essential that the type is known correctly by the awakened node before the actual packet exchange. Since a node may be simultaneously awakened by multiple nodes in the network, there is a chance that interference and/or collisions may occur.

SUMMARY

According to an exemplary embodiment and/or exemplary method of the present invention, a particular type of tone, or a pattern of tones, is sent after the wakeup tone and before any packet exchange to indicate the particular action or actions that are required to be performed by the awakened node. Here, for example, the particular frequency of the tone may indicate a type of the message. In this way, the awakened node may determine the message type even when there are multiple transmitters sending at the same time.

An exemplary embodiment of the present invention is directed to a method of operating a wireless network, the method including sending a wakeup tone, periodically waking up from a sleep mode to listen for the wakeup tone, upon receiving the wakeup tone, listening for at least one second tone, the at least one second tone being one of (i) a tone in a frequency different from the wakeup tone and (ii) a pattern of tones including at least one frequency different from the wakeup tone, and upon receiving the at least one second tone, performing an action based on the at least one second tone.

Another exemplary embodiment of the present invention is directed to a method of operating a wireless network, in which the at least one second tone indicates a message type.

Yet another exemplary embodiment of the present invention is directed to a method of operating a wireless network, in which the action includes at least one of receiving a first message, sending the wakeup tone to another node in the wireless network and transmitting a second message.

Still another exemplary embodiment of the present invention is directed to a method of operating a wireless network, in which the second message includes a sensor reading.

Yet another exemplary embodiment of the present invention is directed to a method of operating a wireless network, in which the wakeup tone is sent simultaneously by more than one node of the wireless network.

Still another exemplary embodiment of the present invention is directed to a method of operating a wireless network, in which the at least one second tone includes a tone transmitted from each of at least two nodes of the wireless network.

Yet another exemplary embodiment of the present invention is directed to a method of operating a wireless network, in which the at least one second tone includes a first tone and a second tone transmitted simultaneously, the first tone being transmitted by a first node and the second tone being transmitted by a second node.

Still another exemplary embodiment of the present invention is directed to a method of operating a wireless network, in which the at least one second tone includes a first pattern of tones and a second pattern of tones transmitted simultaneously, the first pattern being transmitted by a first node and the second pattern being transmitted by a second node.

Yet another exemplary embodiment of the present invention is directed to a method of operating a wireless network, in which the first pattern is different from the second pattern.

An exemplary embodiment of the present invention is directed to a wireless network, which includes a receiver node that includes an arrangement to receive a plurality of tones each at a predefined frequency, an energy storage arrangement, and a control arrangement to operate the receiver node in a sleep mode to conserve energy, the receiver node being configured to periodically wake up from the sleep mode to listen for a wakeup tone, and upon receiving the wakeup tone, listening for at least one second tone, the at least one second tone being one of (i) a tone in a frequency different from the wakeup tone and (ii) a pattern of tones in at least one frequency different from the wakeup tone.

Another exemplary embodiment of the present invention is directed to a wireless network, in which the receiver node further includes an arrangement to perform an action based on the at least one second tone.

Yet another exemplary embodiment of the present invention is directed to a wireless network, in which the receiver node includes at least one of a sensor and an actuator.

Still another exemplary embodiment of the present invention is directed to a wireless network, which includes at least one transmitter node to transmit the wakeup tone and the at least one second tone.

Yet another exemplary embodiment of the present invention is directed to a wireless network, in which the at least one transmitter node includes at least two transmitter nodes, at least one of which transmits the wakeup tone, and each of which simultaneously transmit at least one further tone distinct from one another to collectively form the at least one second tone received by the receiver node.

Still another exemplary embodiment of the present invention is directed to a wireless network, in which the at least two transmitter nodes include a first transmitter node that transmits the at least one further tone as a single tone at a first predefined frequency, and a second transmitter node that transmits the at least one further tone as a single tone at a second predefined frequency different from the first predefined frequency.

Yet another exemplary embodiment of the present invention is directed to a wireless network, in which the at least two transmitter nodes include a first transmitter node that transmits the at least one further tone as plurality of tones in a first pattern, and a second transmitter node that transmits the at least one further tone as a plurality of tones in a second pattern different from the first pattern.

Still another exemplary embodiment of the present invention is directed to a wireless node, which includes a power storage arrangement, and an arrangement to receive a plurality of tones each at a predefined frequency, the wireless node being configured to periodically listen for a wakeup tone, and upon receiving the wakeup tone, listening for at least one second tone, the at least one second tone being one of (i) a tone in a frequency different from the wakeup tone and (ii) a pattern of tones that includes at least one frequency different from the wakeup tone.

Still another exemplary embodiment of the present invention is directed to a wireless node, which includes an arrangement to perform an action based on the at least one second tone.

Yet another exemplary embodiment of the present invention is directed to a wireless node, in which the at least one second tone includes a first tone and a second tone transmitted simultaneously, the first tone being transmitted by a first node and the second tone being transmitted by a second node.

Still another exemplary embodiment of the present invention is directed to a wireless node, in which the at least one second tone includes a first pattern of tones and a second pattern of tones transmitted simultaneously, the first pattern being transmitted by a first node and the second pattern being transmitted by a second node.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
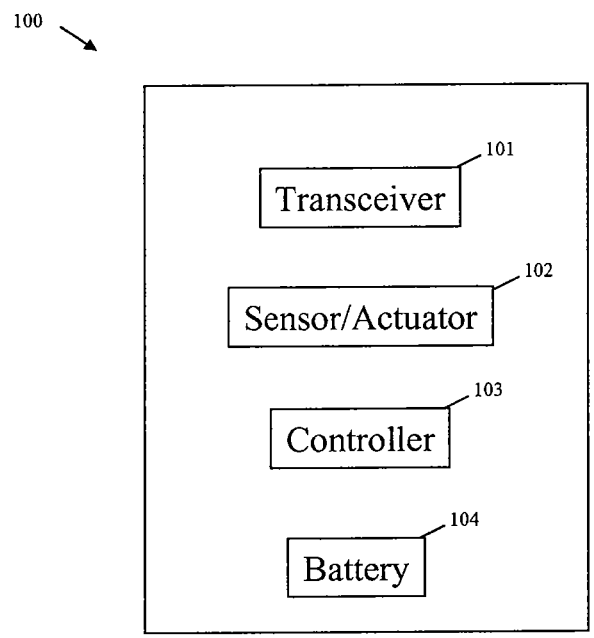
FIG. 1 shows an exemplary wireless node, which operates according to alternating sleep and wake cycles.

Corresponding reference characters indicate corresponding parts throughout the several views. Although the drawings represent embodiments of the invention, the drawings are not necessarily to scale and certain features may be exaggerated in order to better illustrate and explain the invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

A wireless sensor network may be defined, for example, as a distributed system of nodes/motes each equipped with a radio transceiver, a microcontroller and one or more sensors and/or actuators. The nodes in such a network may be small and inexpensive, and consequently the resources provided with each node may be necessarily limited. For example, the wireless nodes of a network may be equipped with a limited energy source, in particular, the wireless nodes may be battery-operated.

FIG. 1 shows an exemplary wireless node 100, which operates according to alternating sleep and wake cycles. The exemplary wireless node 100 includes a radio transceiver 101, a sensor and/or actuator 102, a microcontroller 103 and a battery 104. The radio transceiver 101 enables the exemplary wireless node 100 to send and/or receive wireless transmissions. The sensor and/or actuator 102 senses a condition, and/or actuates a movement of an element. The microcontroller 103 controls the radio transceiver 101 and the sensor and/or actuator 102, or other aspects of the exemplary wireless node 100. The battery 104 provides energy to power the components of the exemplary wireless node 100.

The design of a wireless sensor network for energy constrained nodes may be dictated by longevity concerns. One approach to increase the longevity of a wireless sensor network with energy constrained nodes is to use a sleep schedule where the nodes operate in a low-power or sleep mode for most of the time, periodically waking up to check for activity.

Figure 2:
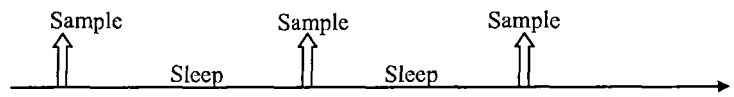
FIG. 2 shows an exemplary wakeup schedule for an energy constrained node of a wireless sensor network.

FIG. 2 shows an exemplary wakeup schedule for an energy constrained node of a wireless sensor network, in which the node operates in the sleep mode most of the time, and which periodically wakes up for a brief time period to take a sample.

Channel Sniffing and Wakeup

The nodes in a wireless network may wake up from time to time and scout the channel for activity. This may be performed, for example, by listening to the channel for a very short period of time and measuring the received signal strength. If the signal strength exceeds a predetermined threshold, the node may remain awake in an attempt to receive a possible transmission, otherwise the node may power itself down to conserve energy. Such a process is sometimes referred to as "sniffing the channel".

The length of the sniffing period and the energy consumed while performing a wakeup may determine the longevity of the network. In practice, the sniffing length is determined, at least in part, by several hardware limitations such as the warm up time of the radio, and the minimum time required to reliably detect a signal in the channel. The sniffing period may be on the order of hundreds of micro-seconds to a few milli-seconds.

Wakeup Schedule

The time at which each node in the network "sniffs" the channel may be determined by a wakeup schedule. Here, for example, the wakeup schedule may be deterministic or random. Moreover, the wakeup schedule may also be different for one or more nodes of the network. In this regard, having differing schedules may provide different delay guarantees for the messages in the network.

Figure 3A:
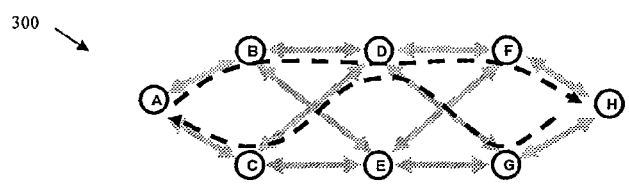
FIG. 3A shows an arrangement of exemplary nodes of an exemplary wireless network, and how the exemplary nodes might communicate messages to one another.
Figure 3B:
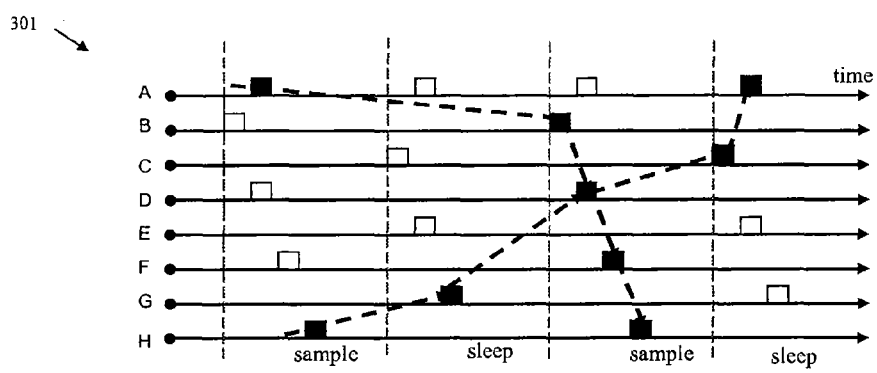
FIG. 3B shows an exemplary schedule to wakeup the exemplary nodes of FIG. 3A, and how the exemplary schedule effects the transmissions of messages between the nodes.

FIGS. 3A and 3B show exemplary nodes A through H of an exemplary wireless network 300, and an exemplary schedule 301 to wakeup the exemplary nodes A through H. In particular, FIG. 3A shows how the exemplary nodes A through H of the exemplary wireless network may communicate with each other. For example, FIG. 3A shows the following: node A can communicate directly with nodes B and C; node B can communicate directly with nodes A, D and E; node C can communicate directly with nodes A, D and E; node D can communicate directly with nodes B, C, F and G; node E can communicate directly with nodes B, C, F and G; node F can communicate directly with nodes D, E and H; node G can communicate directly with nodes D, E and H; and node H can communicate directly with nodes F and G. Such a relationship is shown in FIG. 3A by shaded arrows between the nodes.

FIG. 3A also shows (via a dashed line) the transmission of a message from node A to node H, and the transmission of a message from node H to node A. In particular, the message transmitted from node A to node H is first transmitted from node A to node B, and then transmitted from node B to node D, and then transmitted from node D to node F, and then transmitted from node F to node H. Similarly, but not in identical fashion, the message transmitted from node H to node A is first transmitted from node H to node G, and then transmitted from node G to node D, and then transmitted from node D to node C, and then transmitted from node C to node A. Here, it is noted that the path of the two transmitted messages between nodes A and H is different, although not restricted as such.

FIG. 3B shows an exemplary wakeup schedule 301 for each of the exemplary nodes A through H. Here, a square box represents the time at which the particular exemplary node samples the channel. In this regard, an unfilled white square box indicates that at the sample time there was no activity to be performed by the exemplary node and therefore the exemplary node immediately returned sleep, while a filled black square box indicates that at the sample time there was an activity (e.g., message transmission and/or receipt) to be performed, and therefore the exemplary node stayed awake to perform the activity.

FIG. 3B also shows (via dashed lines) the wakeup sequence timing required for the transfer of the messages depicted in FIG. 3A. Here, the first dashed line representing the wakeup sequence timing required for the message transferred from node A to node H first intersects a sample period for node A, and thereafter intersects the next sample period for node B, and thereafter intersects the next sample period for node D, and thereafter intersects the next sample period for node F, and thereafter intersects the next sample period for node H. The second dashed line representing the wakeup sequence timing required for the message transferred from node H to node A first intersects a sample period for node H, and thereafter intersects the next sample period for node G, and thereafter intersects the next sample period for node D, and thereafter intersects the next sample period for node C, and thereafter intersects the next sample period for node A.

It is noted, for example, with respect to FIG. 3B that the two dashed lines intersect the same sampling period for node D. This represents an example scenario where node D is awakened by two different nodes for two different reasons. That is, node D is awakened by node B to pass along a message to node F, and, at the same time, node D is awakened by node G to pass along a message to node C.

Message Type

As demonstrated above, a node in the network may be awakened for different reasons and by different nodes in the network. According to one exemplary embodiment, the type of the message that follows the wakeup tone may determine the actions that need to be performed by the awakened node after the wakeup.

Determining the type of the message may be essential in many cases, and may change the way the message is received and/or decoded by the node. Depending on the application scenario, the type of the message may include transmitter information (e.g., who has awakened the node), the message route (e.g., who the node should forward the message to), the data content or packet length (e.g., what size of packet should the node expect), or even the priority level of message (e.g., how important the message is). For example, the type of the message may indicate the message route, so that the node knows that for the next step which of its neighbors should be awakened. Another example is the case of messages from mobile nodes. Messages from mobile nodes may have a different format and/or may be on a different frequency channel.

It is noted, for example, that a node may be awakened at the same time by multiple nodes for multiple purposes. For example, a mobile node and stationary node may awaken a node at the same time. It may be essential, therefore, that the node determine why it has been awakened even when it is simultaneously awakened by multiple nodes.

Using the Type Tone after the Wakeup Tone

According to an exemplary embodiment of the present invention, a "type tone" (or more generally a pattern of type tones) is transmitted immediately after the wakeup tone to indicate the type of the message and essentially the reason that the node has been awakened.

Figure 4:
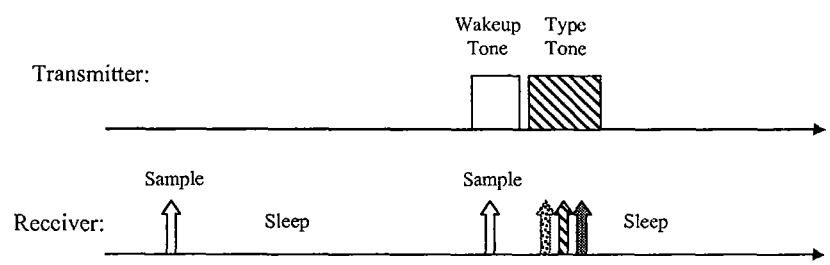
FIG. 4 shows an exemplary embodiment to use a type tone.

FIG. 4 shows an exemplary embodiment of using a type tone. A transmitter sends a wakeup tone (at the time that the receiver is sampling the channel) in the wakeup frequency, and shortly thereafter the transmitter follows the wakeup tone with the "type tone". According to an exemplary embodiment, the frequency on which the type tone is sent indicates the type of the message.

At the receiver side, the node samples the channel (in the wakeup frequency) regularly and/or periodically. If a high signal is detected, the node stays in the receive mode and switches to different frequencies and samples different tone frequencies. In FIG. 4, for example, the node samples three different frequencies, each of which corresponds to a different message type. In this way, the receiver can determine the type of the message. Essentially, the presence of a high signal in a pre-specified frequency channel is used to communicate the type of the message to the receiver.

An advantage of using the type tone after the wakeup tone is its resilience to a collision condition. Since the receiver only checks the signal power, the collision of different transmitters may not have any effect on the signal. That is, if two nodes send two tones at the same time, the received power is only increased at the receiver. Additionally, if the node is awakened by multiple nodes for different message types, the node may detect all the different types and then act accordingly based on the priority level assigned to different message types.

Pattern of Tones

According to another exemplary embodiment, instead of using a single tone, a pattern of tones in different frequencies may be used to indicate different message types. Such an exemplary method may be helpful when there are many different types.

Figure 5:
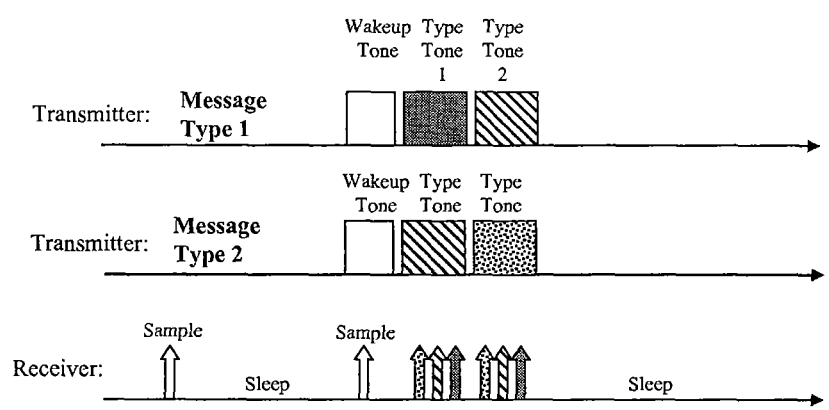
FIG. 5 shows an exemplary embodiment to use a pattern of tone to indicate a message type.

FIG. 5 shows an exemplary embodiment of using a pattern of tone to indicate a message type. Here, the pattern is a sequence of two type tones, each of which is selected from three possible tones. The receivers sample for the three possible frequencies during each tone period. Hence, a total of 3×3=9 different types is provided using this exemplary model. By increasing the length of the tone pattern the probability of false wakeups may be reduced. That is, the probability that noise or interference awaken the node and create a correct message type pattern may be reduced.

As can be seen in FIG. 5, the exemplary embodiment of the present invention allows a node to simultaneously receive messages from multiple nodes of the network without collisions occurring. That is, with the exemplary method of the present invention, messages received simultaneously by a node may be easily distinguished.

A Combined Approach

Figure 6:
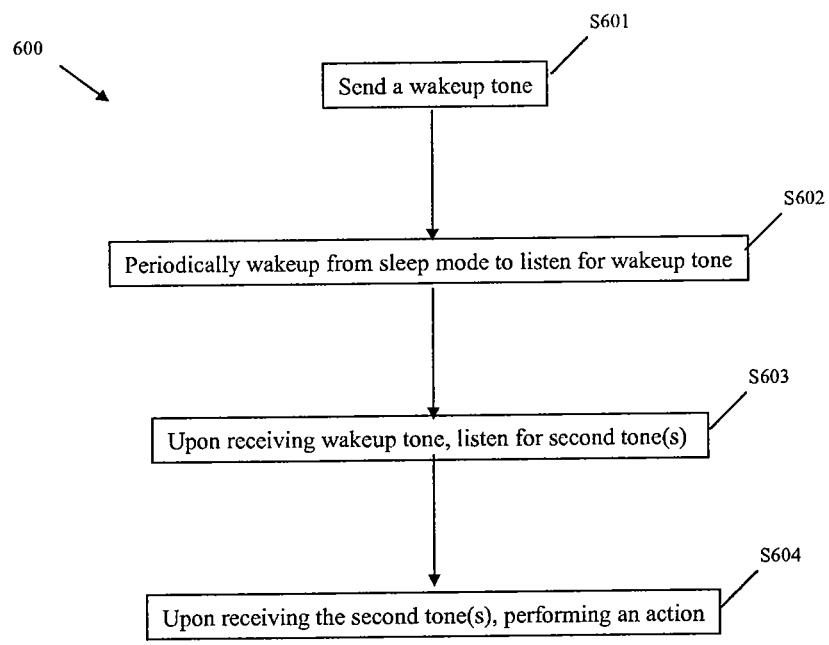
FIG. 6 shows an exemplary method for operating a wireless network.

FIG. 6 shows an exemplary method 600 for operating a wireless network. In this regard, the wireless network may be, for example, a network like the exemplary wireless network 300 shown in FIG. 3A. The exemplary method 600 is described as follows.

In step S601, a wakeup tone is sent to a node in the wireless network. In this regard, the node may be, for example, a wireless sensor node and/or an actuator node, which may or may not be constrained as to a certain resource (e.g., a battery-operated node). In particular, the node may be selected, for example, from one or more the exemplary nodes A through H shown in FIG. 3A. Moreover, the wakeup tone may be sent exclusively by a single node of the wireless network, or alternatively, the wakeup tone may be sent simultaneously by more than one node of the wireless network.

In step S602, the node is periodically woken up from a sleep mode to listen for the wakeup tone. Here, for example, the node may be woken up according to a particular schedule, such as the exemplary wakeup schedule 301 shown in FIG. 3B.

In step S603, upon receiving the wakeup tone, the node listens for at least one second tone, the at least one second tone being one of (i) a tone in a frequency different from the wakeup tone and (ii) a pattern of tones including at least one frequency different from the wakeup tone. Here, for example, the at least one second tone may indicate a message type. In this regard, the at least one second tone may include tones sent exclusively by a single node of the wireless network, or alternatively, the at least one second tone may includes tones transmitted from each of at least two separate nodes of the wireless network. For example, the at least one second tone may include a first tone and a second tone transmitted simultaneously, the first tone being transmitted by a first node and the second tone being transmitted by a second node. In this regard, the at least one second tone may include, for example, a first pattern of tones and a second pattern of tones transmitted simultaneously, the first pattern being transmitted by a first node and the second pattern being transmitted by a second node. Moreover still, the first pattern may be different from the second pattern.

In step S603, upon receiving the at least one second tone, the node performs an action based on the at least one second tone. Here, for example, the action may include receiving a message, sending the wakeup tone to another node in the wireless network and/or transmitting a message (e.g., a message that includes a sensor reading).

As described above, after receiving the wakeup signal, the node switches to different frequencies and samples different tone frequencies. In another embodiment, the node switches to different frequencies and samples different tone frequencies when receiving a series of two or more wakeup tones on different frequencies.

Figure 7:
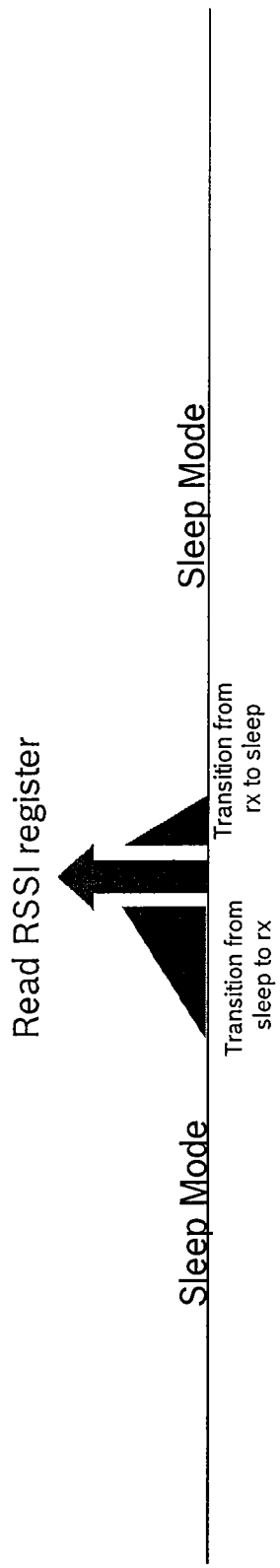
FIG. 7 shows a time line of a channel probe performed by a receiver node.

In the embodiments described above, a single wakeup tone is transmitted and the receiver node performs a channel probe, as illustrated in FIG. 7. To begin the probe, the receiver node transitions from a sleep mode to a receiving (rx) mode. After the transition, the receiver node samples the received signal strength indicator (RSSI), which is an indication of received signal power. After the sample has been completed, the radio is powered off. That is, the receiver node transitions back from the rx node to the sleep node. In order to awaken the receiver node, the sender (i.e., transmitter node) transmits a tone at the correct time while the receiver node is taking the received signal strength (RSS) sample.

Multiple Wakeup Tones

Figure 8:
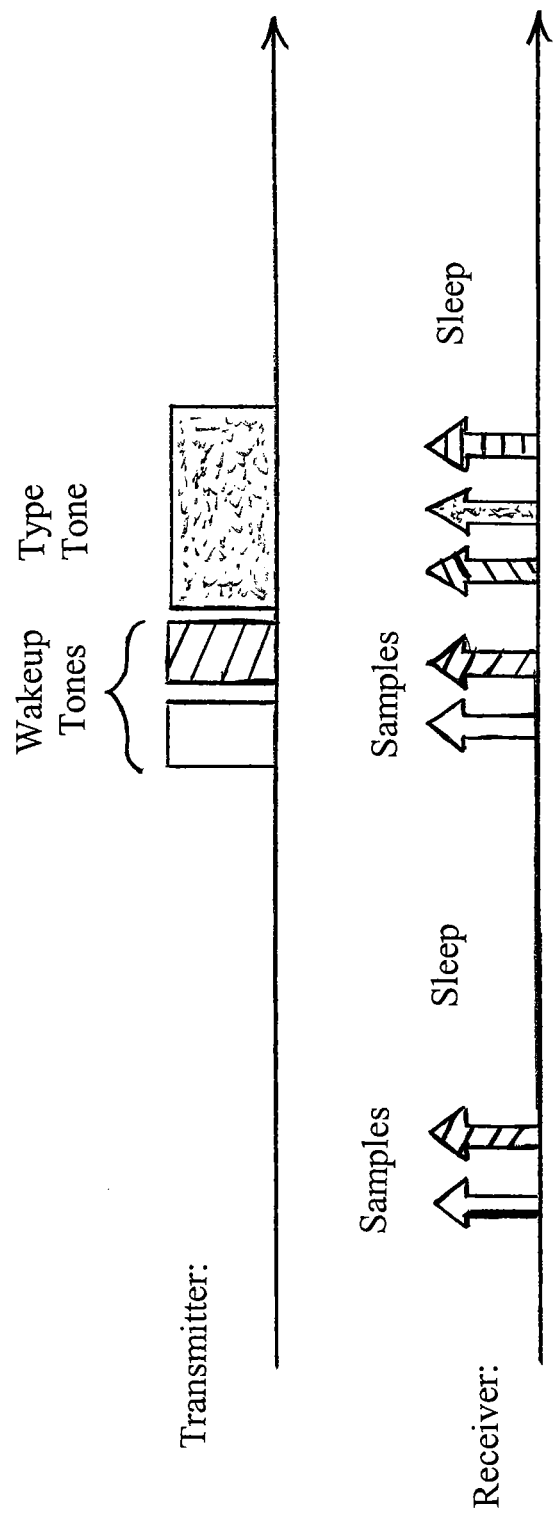
FIG. 8 shows an exemplary embodiment to use a two-frequency wakeup tone.

FIG. 8 shows an exemplary embodiment of using a multi-frequency wakeup tone. A transmitter sends two wakeup tones in two different wakeup frequencies at the time that the receiver is sampling the channels. Shortly thereafter, the transmitter follows the wakeup tones with the "type tone". According to an exemplary embodiment, the frequency on which the type tone is sent indicates the type of the message.

Figure 9:
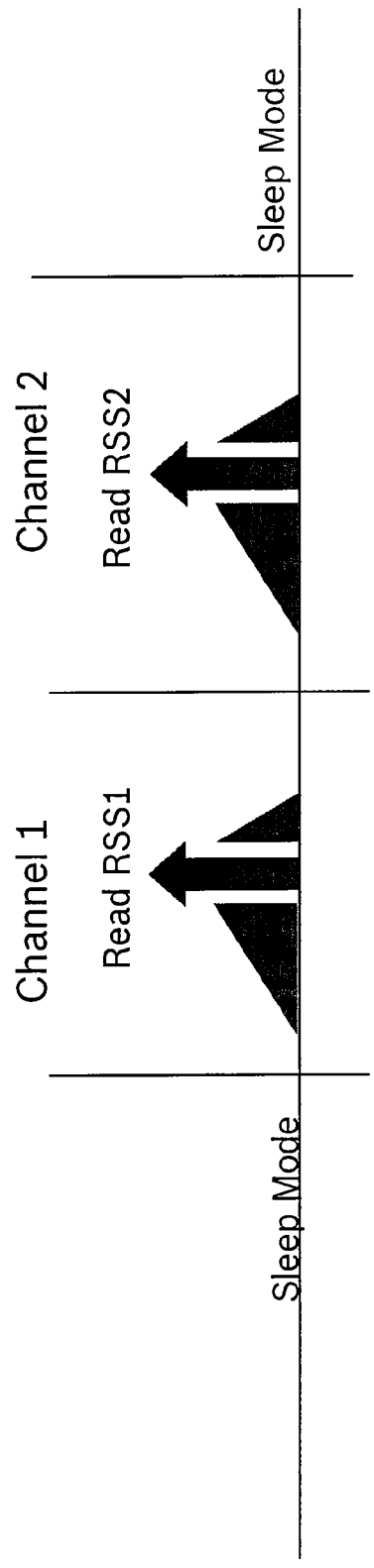
FIG. 9 shows a time line of a channel probe performed by a receiver node on two different channels.

At the receiver side, the node samples the channels (in the wakeup frequencies) regularly and/or periodically. Specifically, the receiver node performs a channel probe on two different channels, as illustrated in FIG. 9. To begin the probe, the receiver node transitions from a sleep mode to a receiving (rx) mode. After the transition, the receiver node samples the received signal strength indicator (RSSI) on a first channel. After the sample has been completed, the radio is powered off and transitions back from the rx mode to the sleep mode. After a suitable waiting period, such as after entering a next time slot, the receiver node again transitions from a sleep mode to a receiving (rx) mode. The receiver node then samples the received signal strength indicator (RSSI) on a second channel, and transitions back from the rx mode to the sleep mode. In order to awaken the receiver node, the sender (i.e., transmitter node) transmits two tones at the correct times and on the correct channels while the receiver node is taking the received signal strength (RSS) samples.

If a high signal is not detected on both the wakeup channels, then the receiver node returns to sleep mode. However, if a high signal is detected on both of the channels, then the node stays in the receive mode and switches to different frequencies and samples different tone frequencies. In FIG. 8, for example, the node samples three different frequencies, each of which corresponds to a different message type. In this way, the receiver can determine the type of the message. Essentially, the presence of a type tone in the form of a high signal in a pre-specified frequency channel is used to communicate the type of the message to the receiver.

Figure 10:
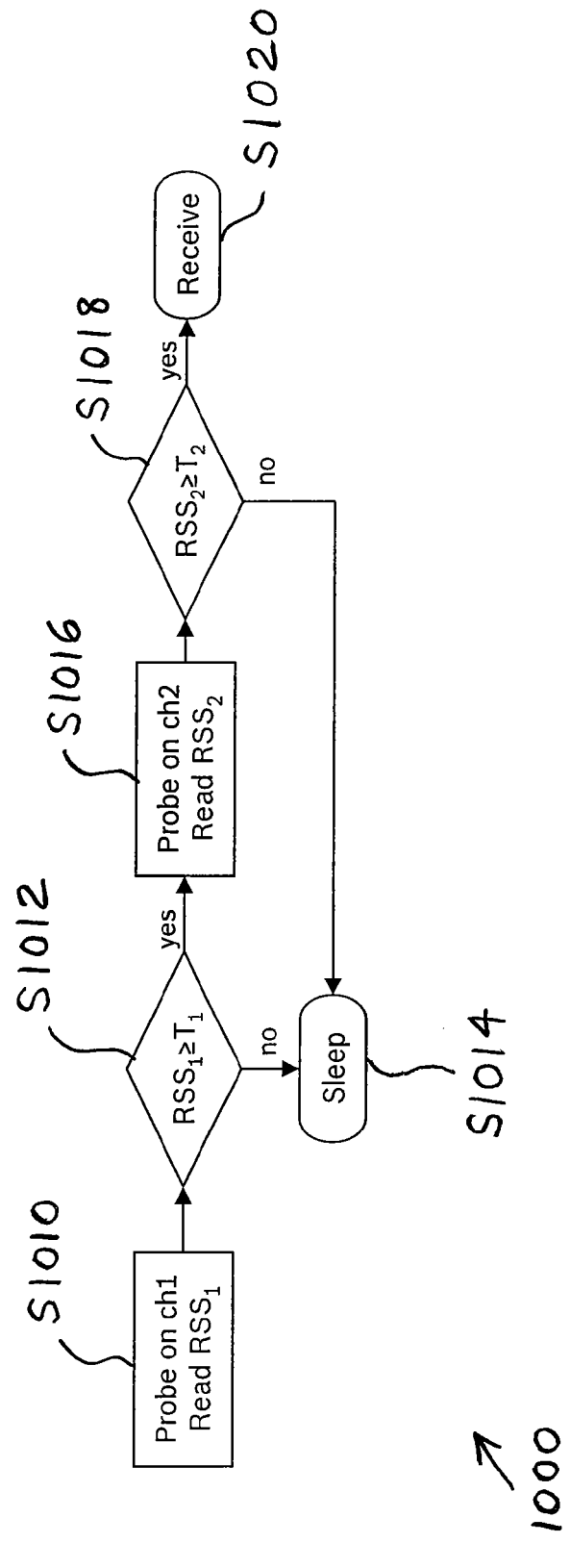
FIG. 10 shows a flow chart of a method of applying AND logic to the two-frequency wakeup tone of FIG. 8.

The AND logic of the above-described embodiment is illustrated in a method 1000 of FIG. 10. In a first step S1010, the receiver node performs a probe on channel 1 and reads the received signal strength $RSS_1$. In a second step S1012, it is determined whether the received signal strength $RSS_1$ is greater than or equal to a first threshold strength value $T_1$, e.g., whether the signal is high. If it is determined in step S1012 that the received signal strength $RSS_1$ is less than the first threshold strength value $T_1$, then the receiver node returns to the sleep mode in step S1014. Else, if it is determined in step S1012 that the received signal strength $RSS_1$ is greater than or equal to the first threshold strength value $T_1$, then the receiver node proceeds to step S1016.

In step S1016, the receiver node performs a probe on channel 2 and reads the received signal strength $RSS_2$. In a next step S1018, it is determined whether the received signal strength $RSS_2$ is greater than or equal to a second threshold strength value $T_2$, e.g., whether the signal is high. If it is determined in step S1018 that the received signal strength $RSS_2$ is less than the second threshold strength value $T_2$, then the receiver node returns to the sleep mode in step S1014. Else, if it is determined in step S1018 that the received signal strength $RSS_2$ is greater than or equal to the second threshold strength value $T_2$, then the receiver node proceeds to entering the receive node (step S1020).

In the embodiment of FIG. 8, two different wakeup tones are transmitted on two different frequencies instead of a single wakeup tone being transmitted on a single frequency, as in the embodiment of FIG. 4. An advantage of using multiple wakeup tones is that it increases the reliability of correctly waking up the receiving node. That is, because the receiving node must receive both wakeup tones before the receiving mode will wake up, it is much less likely that the receiver node will falsely interpret stray signals as a wakeup command. This may be particularly advantageous in embodiments in which significantly more power is used by the receiver node to listen for type tones than for wakeup tones. In such a scenario, it may conserve receiver node power for the receiver node to wake up only in response to two different wakeup tones, and thereby avoid waking up and listening for type tones unnecessarily.

In another embodiment, also corresponding to FIG. 8 wherein two different wakeup tones are transmitted on two different frequencies, if both of the wakeup channels have a low signal detected thereon, then the receiver node returns to sleep mode. However, if a high signal is detected on either of the channels, then the node stays in the receive mode and switches to different frequencies and samples different tone frequencies. If a high signal is detected on a first wakeup channel that is sampled, then the receiver node may not perform sampling on the second wakeup channel. That is, rather than sample the second wakeup channel, the node may simply wait for the time at which the tone frequencies are to be transmitted. At that time, the node stays in the receive mode and switches to different frequencies and samples different tone frequencies. By the receiver node waking up in response to receiving either of the wakeup tones, the reliability of the wakeup process is increased, as the node wakes up even if it does not receive the first wakeup tone but does receive the second wakeup tone. This embodiment may be particularly advantageous in scenarios in which it is more important that the receiver node not miss the type tone(s), and/or in scenarios in which it is less important that the receiver node conserve energy by sampling only one frequency channel.

Figure 11:
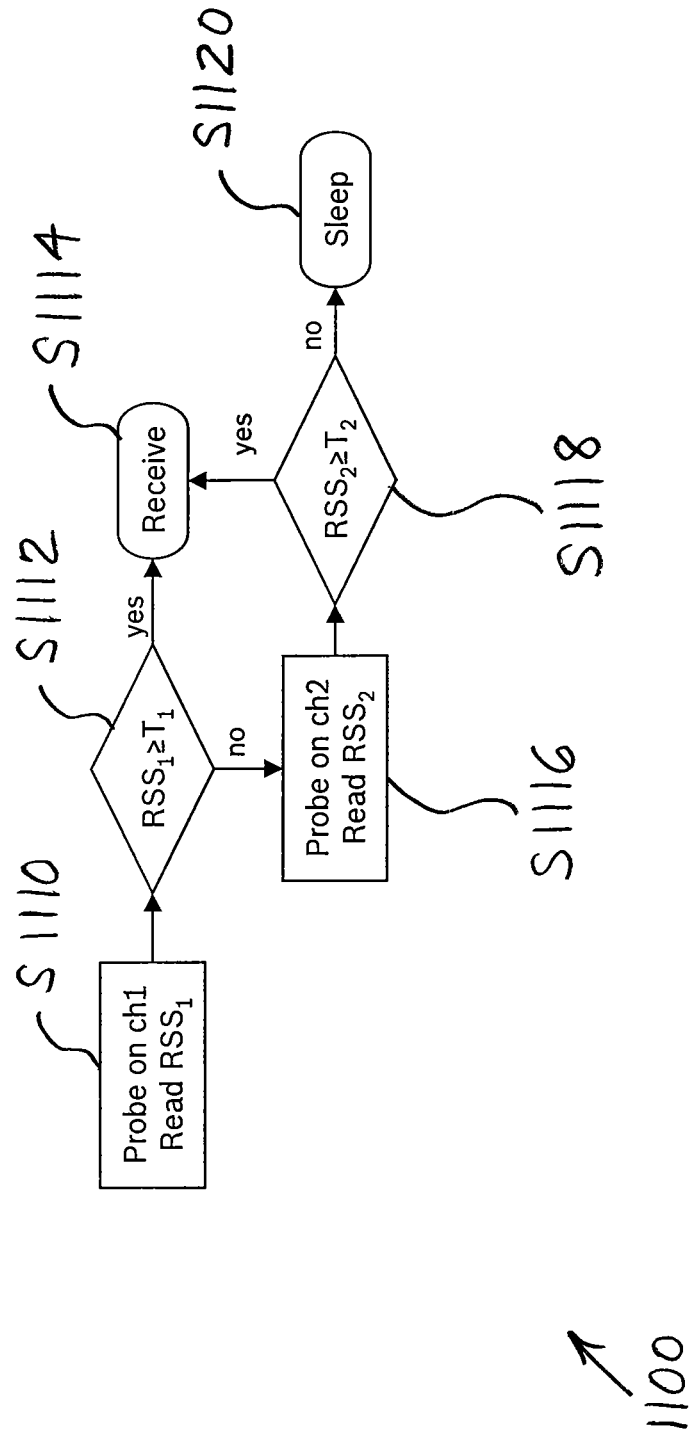
FIG. 11 shows a flow chart of a method of applying OR logic to the two-frequency wakeup tone of FIG. 8.

The OR logic of the above-described embodiment is illustrated in a method 1100 of FIG. 11. In a first step S1110, the receiver node performs a probe on channel 1 and reads the received signal strength $RSS_1$. In a second step S1112, it is determined whether the received signal strength $RSS_1$ is greater than or equal to a first threshold strength value $T_1$, e.g., whether the signal is high. If it is determined in step S1112 that the received signal strength $RSS_1$ is greater than or equal to the first threshold strength value $T_1$, then the receiver node proceeds to entering the receive mode in step S1114. Else, if it is determined in step S1112 that the received signal strength $RSS_1$ is less than the first threshold strength value $T_1$, then the receiver node proceeds to step S1116.

In step S1116, the receiver node performs a probe on channel 2 and reads the received signal strength $RSS_2$. In a next step S1118, it is determined whether the received signal strength $RSS_2$ is greater than or equal to a second threshold strength value $T_2$, e.g., whether the signal is high. If it is determined in step S1118 that the received signal strength $RSS_2$ is less than the second threshold strength value $T_2$, then the receiver node returns to the sleep mode in step S1120. Else, if it is determined in step S1118 that the received signal strength $RSS_2$ is greater than or equal to the second threshold strength value $T_2$, then the receiver node proceeds to entering the receive node (step S1114).

In another embodiment, also corresponding to FIG. 8 wherein two different wakeup tones are transmitted on two different frequencies, the receiver node enters the receive node if the signal on the first channel exceeds a relatively high first threshold signal strength, or if the signal on the first channel exceeds a relatively low first threshold signal strength and if the signal on the second channel exceeds a second threshold signal strength. Thus, different threshold levels (i.e., the relatively high first threshold level and the relatively low first threshold level) may be applied to the same sample (e.g., on the first channel).

A first channel probe is performed and the first received signal strength $RSS_1$ is measured. If the first received signal strength $RSS_1$ is higher than or equal to a relatively high first threshold level A, then there may be no need to take any other sample, and thus the receiver node may go directly to the receiver mode. Else, if the first received signal strength $RSS_1$ is higher than or equal to a relatively low first threshold level B, then a second channel probe is performed and the second received signal strength $RSS_2$ is measured. If the second received signal strength $RSS_2$ is higher than or equal to a second threshold level, then the receiver node may go to the receiver mode. Else, if the second received signal strength $RSS_2$ is lower than or equal to a second threshold level, then the receiver node may go to the sleep mode. Similarly, if the first received signal strength $RSS_1$ is lower than or equal to a relatively low first threshold level B, then the receiver node may go directly to the sleep mode.

Figure 12:
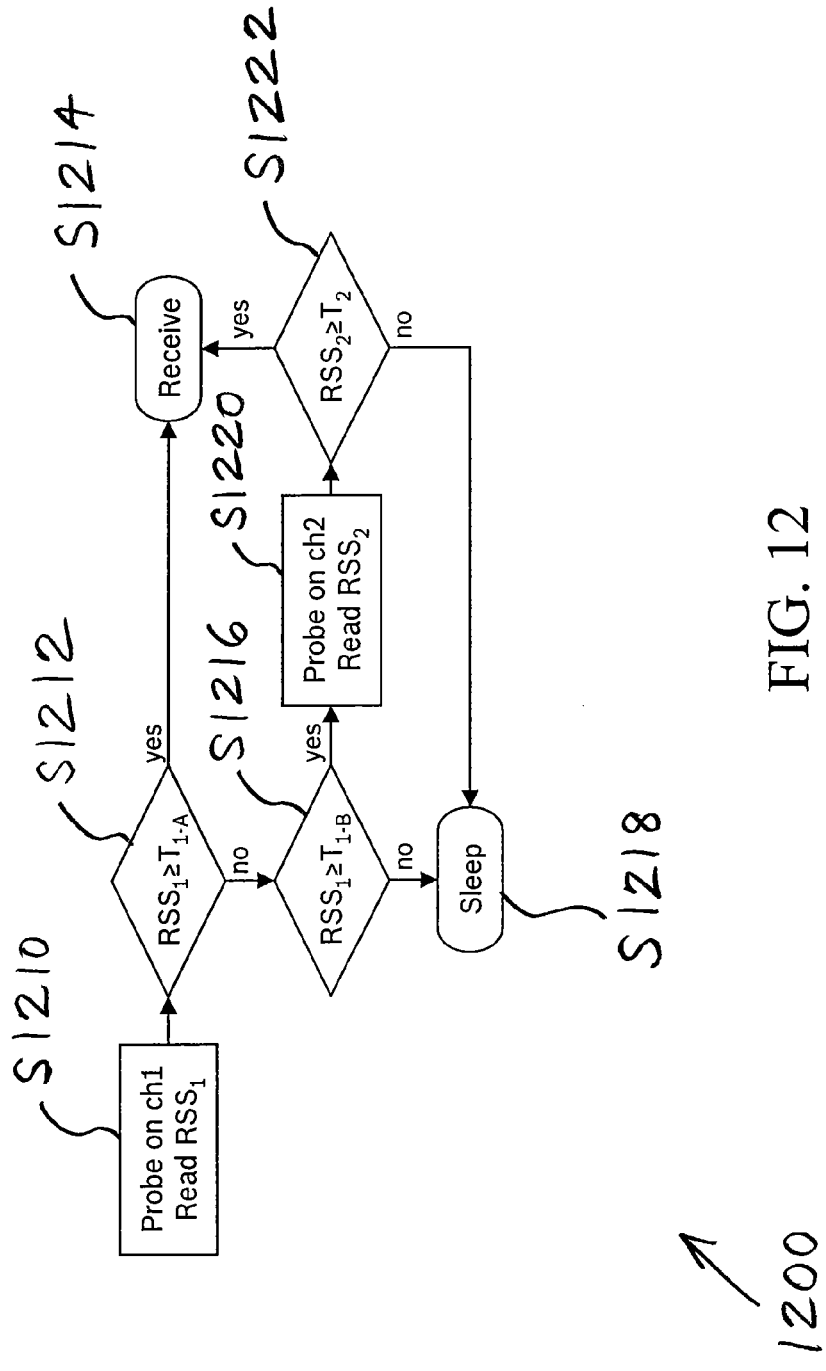
FIG. 12 shows a flow chart of a method of applying conditional OR logic to the two-frequency wakeup tone of FIG. 8.

The conditional OR logic of the above-described embodiment is illustrated in method 1200 of FIG. 12. In a first step S1210, the receiver node performs a probe on channel 1 and reads the received signal strength $RSS_1$. In a second step S1212, it is determined whether the received signal strength $RSS_1$ is greater than or equal to a relatively high first threshold strength value $T_{1-A}$. If it is determined in step S1212 that the received signal strength $RSS_1$ is greater than or equal to the relatively high first threshold strength value $T_{1-B}$, then the receiver node proceeds to directly entering the receive mode in step S1214. Else, if it is determined in step S1212 that the received signal strength $RSS_1$ is less than the relatively high first threshold strength value $T_{1-A}$, then it is determined in step S1216 whether the received signal strength $RSS_1$ is greater than or equal to a relatively low first threshold strength value $T_{1-B}$. If it is determined in step S1216 that the received signal strength $RSS_1$ is less than the relatively low first threshold strength value $T_{H3}$, then the receiver node proceeds to directly entering the sleep mode in step S1218. Else, if it is determined in step S1216 that the received signal strength $RSS_1$ is greater than or equal to the relatively low first threshold strength value $T_{1-B}$, then the receiver node proceeds to step S1220.

In step S1220, the receiver node performs a probe on channel 2 and reads the received signal strength $RSS_2$. In a next step S1222, it is determined whether the received signal strength $RSS_2$ is greater than or equal to a second threshold strength value $T_2$, e.g., whether the signal is high. If it is determined in step S1222 that the received signal strength $RSS_2$ is less than the second threshold strength value $T_2$, then the receiver node returns to the sleep mode in step S1218. Else, if it is determined in step S1222 that the received signal strength $RSS_2$ is greater than or equal to the second threshold strength value $T_2$, then the receiver node proceeds to entering the receive mode (step S1214).

Figure 13:
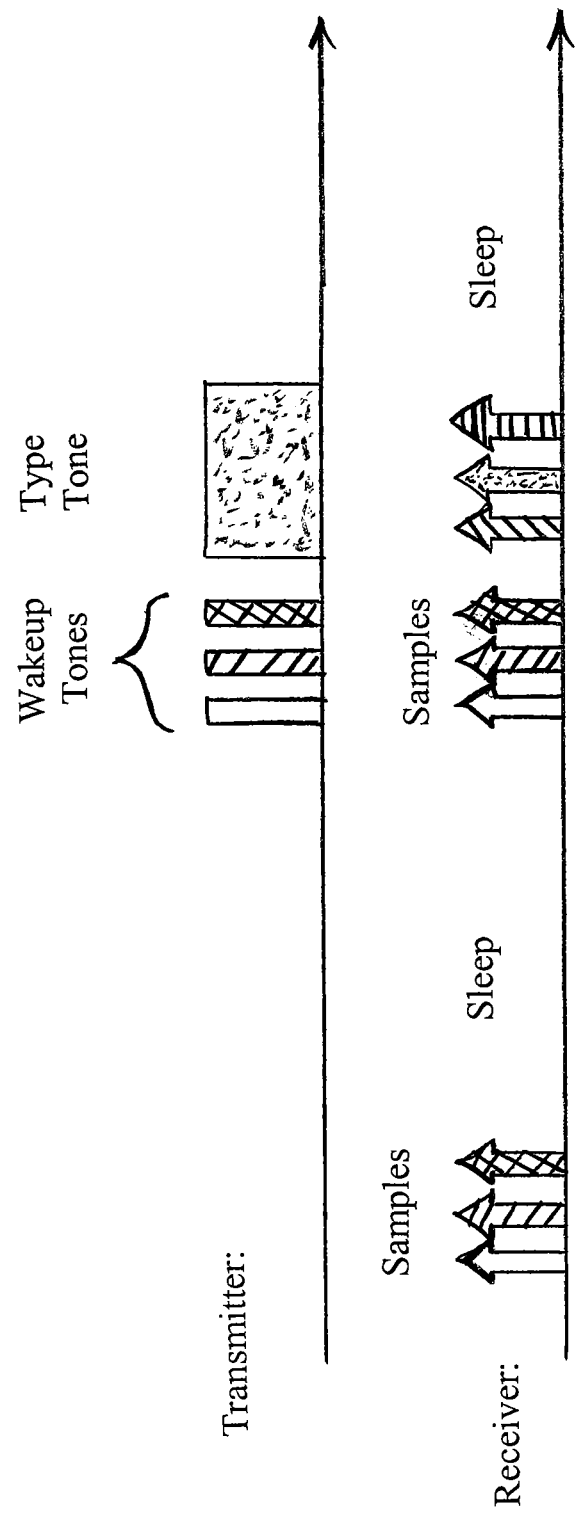
FIG. 13 shows an exemplary embodiment to use a three-frequency wakeup tone.

The wakeup signal may include any number of wakeup tones, and is not limited to one or two wakeup tones. In the embodiment of FIG. 13, three different wakeup tones are transmitted on three different frequencies instead of one or two wakeup tones being transmitted on one or two frequencies, as in the embodiments of FIGS. 4 and 8. Shortly thereafter, the transmitter follows the wakeup tones with the "type tone". According to an exemplary embodiment, the frequency on which the type tone is sent indicates the type of the message.

Figure 14:
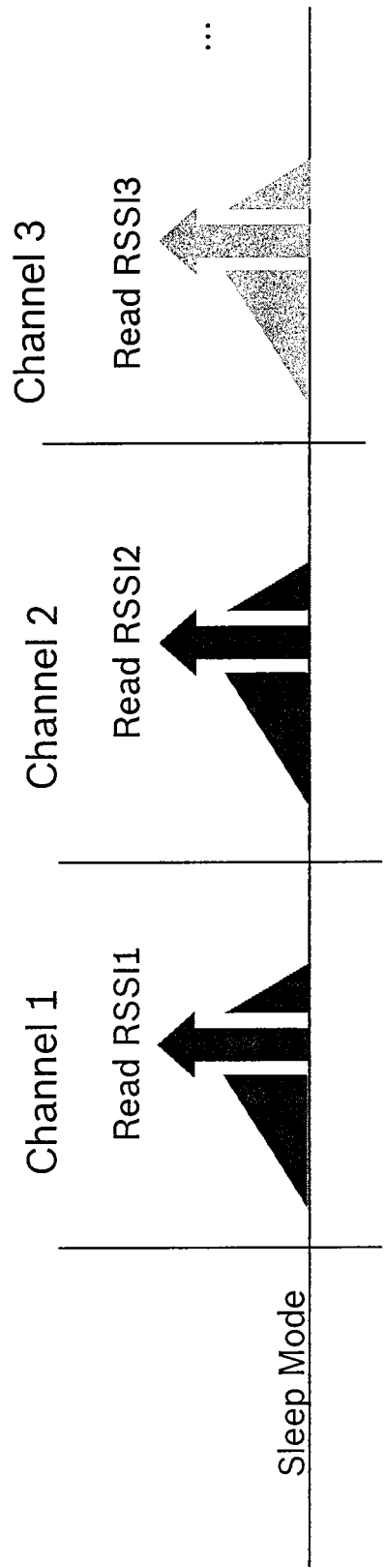
FIG. 14 shows a time line of a channel probe performed by a receiver node on three different channels.

At the receiver side, the node samples the channels (in the wakeup frequencies) regularly and/or periodically. Specifically, the receiver node performs a channel probe on three different channels, as illustrated in FIG. 14. To begin the probe, the receiver node transitions from a sleep mode to a first receiving (rx) mode. After the transition, the receiver node samples the received signal strength indicator (RSSI) on a first channel.

After the sample has been completed, the radio is powered off and transitions back from the rx mode to the sleep mode. After a suitable waiting period, such as after entering a next time slot, the receiver node again transitions from a sleep mode to a receiving (rx) mode. The receiver node then samples the received signal strength indicator (RSSI) on a second channel.

After the sample has been completed, the radio is powered off and transitions back from the rx node to the sleep mode. After a suitable waiting period, such as after entering a next time slot, the receiver node again transitions from a sleep mode to a receiving (rx) mode. The receiver node then samples the received signal strength indicator (RSSI) on a third channel, and transitions back from the rx mode to the sleep mode. In order to awaken the receiver node, the sender (i.e., transmitter node) transmits three tones at the correct times and on the correct channels while the receiver node is taking the received signal strength (RSS) samples.

If a high signal is not detected on all three of the wakeup channels, then the receiver node returns to sleep mode. However, if a high signal is detected on all three of the channels, then the node stays in the receive mode and switches to different frequencies and samples different tone frequencies. An advantage of requiring three wakeup tones is to be received instead of only two is that it further decreases the probability that the receiving node incorrectly interprets noise or stray signals as a wakeup signal. This may be particularly advantageous in noisy environments in which there are a lot of stray signals which could be incorrectly interpreted as consecutive or back-to-back wakeup tones. In such a scenario, requiring three wakeup tones to be received before the receiver node wakes up may conserve power if the node would otherwise consume a significantly higher level of power by unnecessarily listening for type tones when none are being transmitted.

Figure 15:
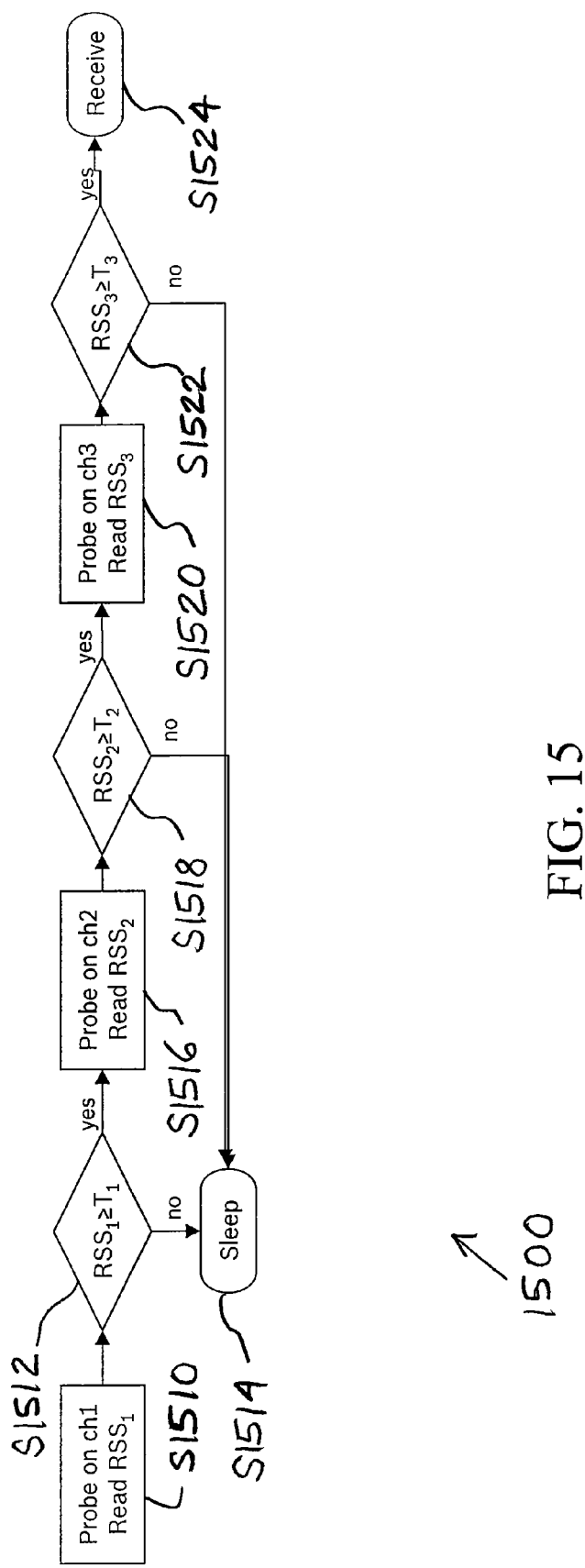
FIG. 15 shows a flow chart of a method of applying AND logic to the three-frequency wakeup tone of FIG. 13.
Figure 16:
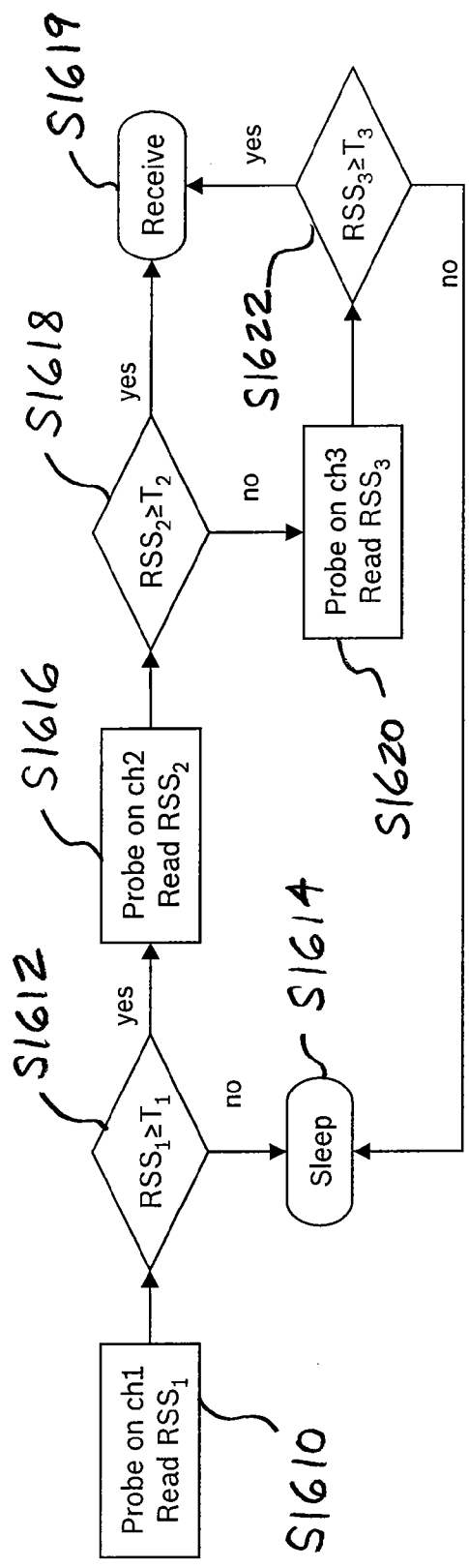
FIG. 16 shows a flow chart of a method of applying a combination of AND logic and OR logic to the three-frequency wakeup tone of FIG. 13.

The AND logic of the above-described embodiment is illustrated in method 1500 of FIG. 15. In a first step 1510, the receiver node performs a probe on channel 1 and reads the received signal strength $RSS_1$. In a second step S1512, it is determined whether the received signal strength $RSS_1$ is greater than or equal to a first threshold strength value $T_1$, e.g., whether the signal is high. If it is determined in step S1512 that the received signal strength $RSS_1$ is less than the first threshold strength value $T_1$, then the receiver node returns to the sleep mode in step S1514. Else, if it is determined in step S1512 that the received signal strength $RSS_1$ is greater than or equal to the first threshold strength value $T_1$, then the receiver node proceeds to step S1516.

In step S1516, the receiver node performs a probe on channel 2 and reads the received signal strength $RSS_2$. In a next step S1518, it is determined whether the received signal strength $RSS_2$ is greater than or equal to a second threshold strength value $T_2$, e.g., whether the signal is high. If it is determined in step S1518 that the received signal strength $RSS_2$ is less than the second threshold strength value $T_2$, then the receiver node returns to the sleep mode in step S1514. Else, if it is determined in step S1518 that the received signal strength $RSS_2$ is greater than or equal to the second threshold strength value $T_2$, then the receiver node proceeds to step S1520.

In step S1520, the receiver node performs a probe on channel 3 and reads the received signal strength $RSS_3$. In a next step S1522, it is determined whether the received signal strength $RSS_3$ is greater than or equal to a third threshold strength value $T_3$, e.g., whether the signal is high. If it is determined in step S1522 that the received signal strength $RSS_3$ is less than the third threshold strength value $T_3$, then the receiver node returns to the sleep mode in step S1514. Else, if it is determined in step S1522 that the received signal strength $RSS_3$ is greater than or equal to the second threshold strength value $T_3$, then the receiver node proceeds to entering the receive mode (step S1524).

In yet another embodiment, also corresponding to FIG. 13 wherein three different wakeup tones are transmitted on three different frequencies, if a high signal is not detected on the first wakeup channel as well as on at least one of the second and third wakeup channels, then the receiver node returns to sleep mode. However, if a high signal is detected on the first channel and is also detected on either of the second and third channels, then the node stays in the receive mode and switches to different frequencies and samples different tone frequencies. If a high signal is detected on both a first wakeup channel and a second wakeup channel that are sampled, then the receiver node may not sample on the third wakeup channel. That is, rather than sample the third wakeup channel, the node may wait for the time at which the tone frequencies are to be transmitted. At that time, the node stays in the receive mode and switches to different frequencies and samples different tone frequencies. By the receiver node waking up in response to receiving the first wakeup tone and either of the second and third wakeup tones, the reliability of the wakeup process is increased, as the node wakes up even if it does not receive the second wakeup tone but does receive the third wakeup tone. This embodiment may be particularly advantageous in scenarios in which the frequency of the first frequency channel may be reliably received, but the frequencies of the second and third frequency channels are less reliably received. This embodiment may also be advantageous in scenarios in which it is less important that the receiver node conserve energy by sampling only one frequency channel.

This may be particularly advantageous in embodiments in which significantly more power is used by the receiver node to listen for type tones than for wakeup tones. In such a scenario, it may conserve receiver node power for the receiver node to wake up only in response to two different wakeup tones, and thereby avoid waking up and listening for type tones unnecessarily.

The combination of AND logic and OR logic of the above-described embodiment is illustrated in method 1600 of FIG.

16. In a first step 1610, the receiver node performs a probe on channel 1 and reads the received signal strength $RSS_1$. In a second step S1612, it is determined whether the received signal strength $RSS_1$ is greater than or equal to a first threshold strength value $T_1$, e.g., whether the signal is high. If it is determined in step S1612 that the received signal strength $RSS_1$ is less than the first threshold strength value $T_1$, then the receiver node returns to the sleep mode in step S1614. Else, if it is determined in step S1612 that the received signal strength $RSS_1$ is greater than or equal to the first threshold strength value $T_1$, then the receiver node proceeds to step S1616.

In step S1616, the receiver node performs a probe on channel 2 and reads the received signal strength $RSS_2$. In a next step S1618, it is determined whether the received signal strength $RSS_2$ is greater than or equal to a second threshold strength value $T_2$, e.g., whether the signal is high. If it is determined in step S1618 that the received signal strength $RSS_2$ is greater than the second threshold strength value $T_2$, then the receiver node proceeds to enter the receive mode in step S1619. Else, if it is determined in step S1618 that the received signal strength $RSS_2$ is less than the second threshold strength value $T_2$, then the receiver node proceeds to step S1620.

In step S1620, the receiver node performs a probe on channel 3 and reads the received signal strength $RSS_3$. In a next step S1622, it is determined whether the received signal strength $RSS_3$ is greater than or equal to a third threshold strength value $T_3$, e.g., whether the signal is high. If it is determined in step S1622 that the received signal strength $RSS_3$ is less than the third threshold strength value $T_3$, then the receiver node returns to the sleep mode in step S1614. Else, if it is determined in step S1622 that the received signal strength $RSS_3$ is greater than or equal to the third threshold strength value $T_3$, then the receiver node proceeds to entering the receive mode (step S1619).

In embodiments described above, it may be decided whether to listen for at least one second tone dependent upon the received pattern of wakeup tones. More particularly, the deciding may be dependent upon whether the received pattern of wakeup tones matches an expected pattern of wakeup tones. For example, all two or three expected wakeup tones may need to be received before the second tone is listened for.

In some embodiments there may be multiple possible expected patterns of wakeup tones, and reception of any one of the possible patterns may trigger listening for the second tone. The expected patterns of wakeup tones may include one of two transmitted wakeup tones, the other of the two transmitted wakeup tones, and/or both of two transmitted wakeup tones (e.g., OR logic). In another embodiment the expected pattern may include one first wakeup tone and either or both of second and third wakeup tones (e.g., combination of AND logic and OR logic).

Wakeup Tones Specify the Type of Message

In the exemplary embodiments described above, the wakeup tone or tones only wake up the receiver node and the following tones convey the message type. However, according to another exemplary embodiment, the pattern of wake up tones also conveys the message type. Such an exemplary method may be more efficient than using separate wakeup and messaging tones when it is known that the wakeup tones may be reliably received.

It is to be understood that other features of the embodiments of transmitting multiple wakeup tones may be substantially similar to the features of the previously described embodiments of transmitting a single wakeup tone. For example, the wakeup tones may be sent simultaneously by more than one node of the wireless network, just as a single wakeup tone may be sent simultaneously by more than one node of the wireless network. However, such substantially similar features are not described in detail herein in order to avoid needless repetition.

While this invention has been described as having an exemplary design, the invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a wireless network, the method including:
    sending a pattern of wakeup tones, each of the wakeup tones having a different frequency;
    periodically waking up from a sleep mode to listen for the wakeup tones;
    receiving the pattern of wakeup tones during the listening;
    deciding whether to listen for at least one second tone, the deciding being dependent upon the received pattern of wakeup tones,
    wherein the deciding is dependent upon whether the received pattern of wakeup tones matches an expected pattern of wakeup tones.

2. The method of claim 1, wherein the expected pattern of wakeup tones includes a first wakeup tone and at least one of a second wakeup tone and a third wakeup tone.

3. The method of claim 1, wherein the expected pattern of wakeup tones includes a first wakeup tone and/or a second wakeup tone.

4. The method of claim 1, wherein the expected pattern of wakeup tones includes each of a plurality of wakeup tones.

5. A method of operating a wireless network, the method including:
    sending a pattern of wakeup tones, each of the wakeup tones having a different frequency;
    periodically waking up from a sleep mode to listen for the wakeup tones;
    receiving the pattern of wakeup tones during the listening;
    deciding whether to listen for at least one second tone, the deciding being dependent upon the received pattern of wakeup tones,
    wherein the at least one second tone is one of (i) a tone in a frequency different from the wakeup tones and (ii) a pattern of tones including at least one frequency different from the wakeup tones.

6. A method of operating a wireless network, the method including:
    sending a pattern of wakeup tones, each of the wakeup tones having a different frequency;
    periodically waking up from a sleep mode to listen for the wakeup tones;
    receiving the pattern of wakeup tones during the listening;
    deciding whether to listen for at least one second tone, the deciding being dependent upon the received pattern of wakeup tones,
    wherein the at least one second tone indicates a message type, the method comprising the further step, upon receiving the at least one second tone, of performing an action based on the at least one second tone, wherein the action includes at least one of receiving a first message, sending the wakeup tones to another node in the wireless network and transmitting a second message, the second message including a sensor reading.

7. A method of operating a wireless network, the method including:
- sending a pattern of wakeup tones, each of the wakeup tones having a different frequency;
- periodically waking up from a sleep mode to listen for the wakeup tones;
- receiving the pattern of wakeup tones during the listening;
- deciding whether to listen for at least one second tone, the deciding being dependent upon the received pattern of wakeup tones,
- wherein the wakeup tones are sent simultaneously by more than one node of the wireless network, and the at least one second tone includes a tone transmitted from each of at least two nodes of the wireless network.

8. The method of claim 7, wherein the at least one second tone includes a first tone and a second tone transmitted simultaneously, the first tone being transmitted by a first node and the second tone being transmitted by a second node.

9. The method of claim 7, wherein the at least one second tone includes a first pattern of tones and a second pattern of tones transmitted simultaneously, the first pattern being transmitted by a first node and the second pattern being transmitted by a second node, the first pattern being different from the second pattern.

10. A method of operating a wireless network, the method including:
- sending a pattern of wakeup tones, each of the wakeup tones having a different frequency;
- periodically waking up from a sleep mode to listen for the wakeup tones;
- receiving the pattern of wakeup tones during the listening;
- deciding whether to listen for at least one second tone, the deciding being dependent upon the received pattern of wakeup tones,
- wherein the listening for the wakeup tones includes detecting the presence of a high signal in at least one pre-specified frequency channel, and listening for at least one second tone includes detecting the presence of a high signal in another pre-specified frequency channel.

11. A method of operating a wireless network, the method including:
- sending a pattern of wakeup tones, each of the wakeup tones having a different frequency;
- periodically waking up from a sleep mode to listen for the wakeup tones;
- receiving the pattern of wakeup tones during the listening; deciding whether to listen for at least one second tone, the deciding being dependent upon the received pattern of wakeup tones,
- wherein the frequency of the at least one second tone indicates a message type from among a plurality of potential message types having different priority levels, the method further comprising: prioritizing the performing of the action according to the priority level of the message type of the at least one second tone.

12. A wireless network, comprising: a receiver node that includes: an arrangement to receive a plurality of tones each at a predefined frequency; an energy storage arrangement; and a control arrangement to operate the receiver node in a sleep mode to conserve energy, wherein the receiver node is configured to periodically wake up from the sleep mode to listen for a plurality of wakeup tones, and upon receiving the wakeup tones, listening for at least one second tone,
- wherein the at least one second tone is one of (i) a tone in a frequency different from the wakeup tones and (ii) a pattern of tones in at least one frequency different from the wakeup tones, the receiver node further including an arrangement to perform an action based on the at least one second tone.

13. The wireless network of claim 12, wherein the receiver node includes at least one of a sensor and an actuator.

14. The wireless network of claim 12, further comprising at least one transmitter node to transmit the wakeup tones and the at least one second tone.

15. A wireless node, comprising:
- a power storage arrangement; and
- an arrangement to receive a plurality of tones each at a predefined frequency,
- wherein the wireless node is configured to periodically listen for a pattern of wakeup tones, and upon receiving the wakeup tones, listen for at least one second tone, the at least one second tone being one of (i) a tone in a frequency different from the wakeup tones and (ii) a pattern of tones that includes at least one frequency different from the wakeup tones, and
- further comprising: an arrangement to perform an action based on the at least one second tone.

16. The wireless node of claim 15, wherein the at least one second tone includes a first tone and a second tone transmitted simultaneously, the first tone being transmitted by a first node and the second tone being transmitted by a second node.

17. The wireless node of claim 15, wherein the at least one second tone includes a first pattern of tones and a second pattern of tones transmitted simultaneously, the first pattern being transmitted by a first node and the second pattern being transmitted by a second node.

* * * * *